United States Patent
Razaghi et al.

(10) Patent No.: US 11,610,194 B2
(45) Date of Patent: *Mar. 21, 2023

(54) TRANSACTION OBJECT READER WITH ANALOG AND DIGITAL SIGNAL INTERFACE

(71) Applicant: Block, Inc., Oakland, CA (US)

(72) Inventors: Mani Razaghi, Oakland, CA (US); Joseph Laucks, San Francisco, CA (US); Jeremy Martin, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,473

(22) Filed: Jun. 28, 2021

(65) Prior Publication Data

US 2021/0326541 A1 Oct. 21, 2021

Related U.S. Application Data

(63) Continuation of application No. 16/564,553, filed on Sep. 9, 2019, now Pat. No. 11,100,298, which is a continuation of application No. 15/836,691, filed on Dec. 8, 2017, now Pat. No. 10,410,021.

(51) Int. Cl.
| | |
|---|---|
| *G06Q 20/34* | (2012.01) |
| *G06Q 20/32* | (2012.01) |
| *G06K 7/08* | (2006.01) |
| *G06K 13/067* | (2006.01) |
| *H04W 4/24* | (2018.01) |

(52) U.S. Cl.
CPC .......... *G06Q 20/3278* (2013.01); *G06K 7/083* (2013.01); *G06K 7/087* (2013.01); *G06K 7/089* (2013.01); *G06K 13/067* (2013.01); *H04W 4/24* (2013.01)

(58) Field of Classification Search
CPC ...... G06K 7/0004; G06K 7/083; G06K 7/087; G06K 7/089; G06K 7/10336
USPC .................................................. 235/440, 449
See application file for complete search history.

(56) References Cited

U.S. PATENT DOCUMENTS

| | | | |
|---|---|---|---|
| 9,230,143 | B2 | 1/2016 | Wade et al. |
| 10,057,395 | B1 | 8/2018 | Wagstaff et al. |
| 2006/0255128 | A1 | 11/2006 | Johnson et al. |
| 2014/0001263 | A1 | 1/2014 | Babu et al. |
| 2016/0171486 | A1 | 6/2016 | Wagner et al. |
| 2019/0095655 | A1 | 3/2019 | Krawczewicz et al. |
| 2021/0326827 | A1 | 10/2021 | Razaghi et al. |

*Primary Examiner* — Toan C Ly
(74) *Attorney, Agent, or Firm* — Polsinelli PC

(57) ABSTRACT

A card reader includes a digital connector such as a Universal Serial Bus (USB) plug or an Apple® Lightning® plug. The digital connector includes a corresponding connector interface, which provides voltage to at least a card reader interface and an integrated circuit (IC) of the card reader. The card reader interface outputs an analog transaction information signal upon reading the card. The IC generates a digital version of the analog transaction information signal, encrypts the digital version, converts that into an analog audio signal. The audio signal can then be sent to the connector interface, which converts it into a digital signal such as a USB or Apple® Lightning® signal that is sent by the digital connector to a mobile device. Alternately, the audio signal can be sent to a microcontroller that converts the audio signal to a digital format such as USB, and then to the digital connector.

20 Claims, 12 Drawing Sheets

TRANSACTION OBJECT READER WITH ANALOG AND DIGITAL SIGNAL INTERFACE

CROSS-REFERENCE TO RELATED APPLICATIONS

This application is a Continuation of, and claims priority to, U.S. Non-Provisional patent application Ser. No. 16/564,553, filed Sep. 9, 2019, which is a Continuation of, and claims priority to, U.S. Non-Provisional patent application Ser. No. 15/836,691, filed Dec. 8, 2017, now U.S. Pat. No. 10,410,021, the full content of each is incorporated herein by reference in its entirety.

BACKGROUND

Point of sale (POS) terminals allow customers to easily pay merchants, and typically include a card reader, such as the magnetic stripe card reader or a Europay/Mastercard/Visa (EMV) integrated circuit (IC) chip card reader. POS terminals also typically include a computer and a network interface through which the computer can communicate the information read from the card to a payment server that then authorizes and completes the transaction.

Portable POS terminals sometimes use an existing mobile device, such as a smartphone, to fill the role of the computer and network interface, where a separate card reader device communicates with the mobile device.

Increasingly, mobile devices are manufactured to be as small as possible and with as few ports as possible. Most modern mobile devices only include a single port—either a Universal Serial Bus Type C (USB-C) port or an Apple® Lightning® port.

There is a need for card reader devices with USB-C plugs and Apple® Lightning® plugs.

DETAILED DESCRIPTION

A card reader includes a digital connector such as a Universal Serial Bus (USB) plug or an Apple® Lightning® plug. The digital connector includes a corresponding connector interface, which provides voltage to at least a card reader interface and an integrated circuit (IC) of the card reader. The card reader interface outputs an analog transaction information signal upon reading the card. The IC generates a digital version of the analog transaction information signal, encrypts the digital version, converts that into an analog audio signal. The audio signal can then be sent to the connector interface, which converts it into a digital signal such as a USB or Apple® Lightning® signal that is sent by the digital connector to a mobile device. Alternately, the audio signal can be sent to a microcontroller that converts the audio signal to a digital format such as USB, and then to the digital connector.

Figure 1A:
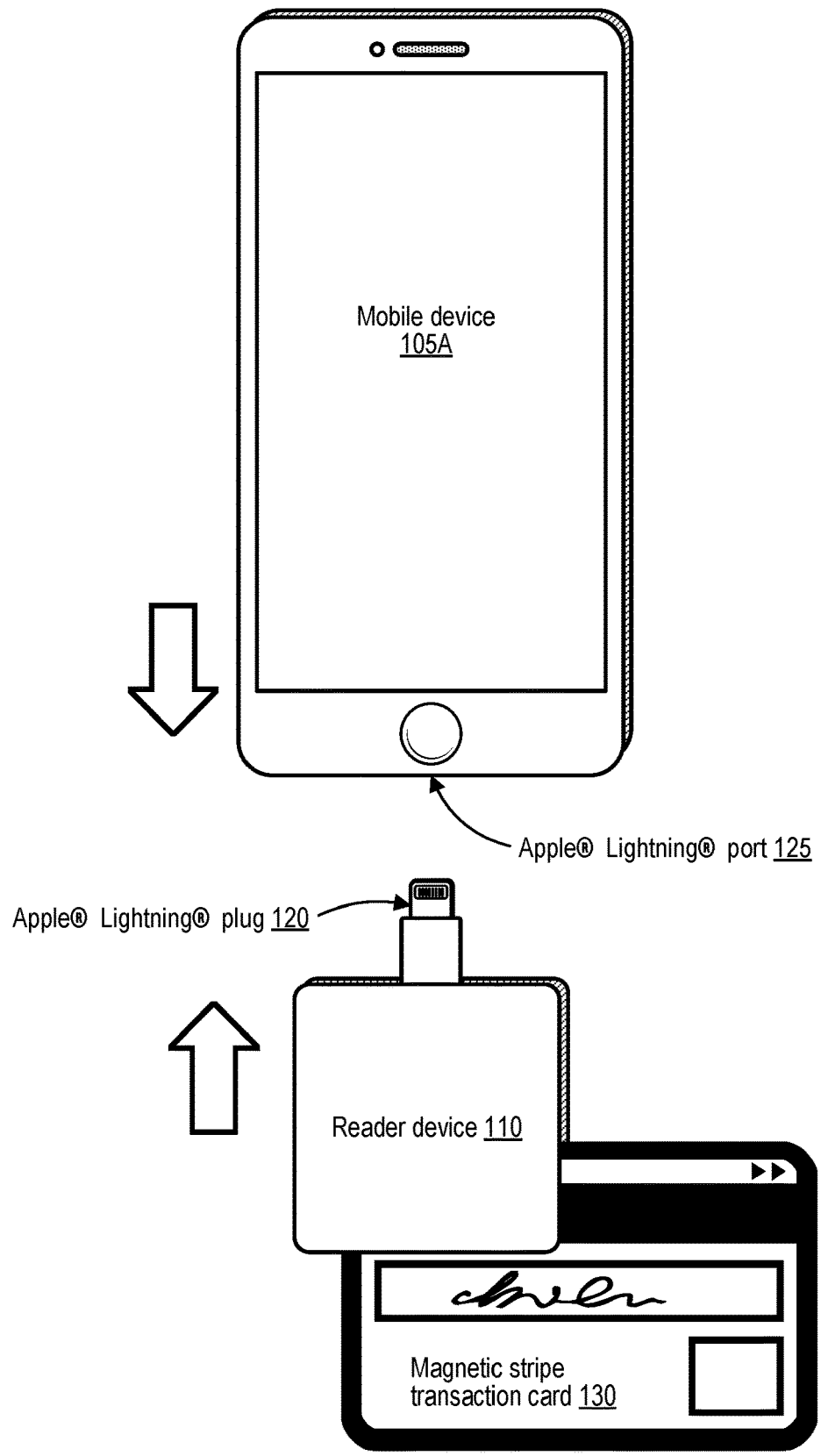
FIG. 1A illustrates a magstripe card reader with an Apple® Lightning® plug to be plugged into an Apple® Lightning® port of a mobile device.

FIG. 1A illustrates a magstripe card reader with an Apple® Lightning® plug to be plugged into an Apple® Lightning® port of a mobile device.

In particular, FIG. 1A illustrates a card reader device 110 with an Apple® Lightning® plug 120 as well as a mobile device 105A with an Apple® Lightning® port 125. A magnetic stripe transaction card 130 is illustrated partially inside a card slot of the reader device 110.

White block arrows to the left of the card reader device 110 and the mobile device 105A indicate that the plug 120 is meant to enter the port 125.

Figure 1B:
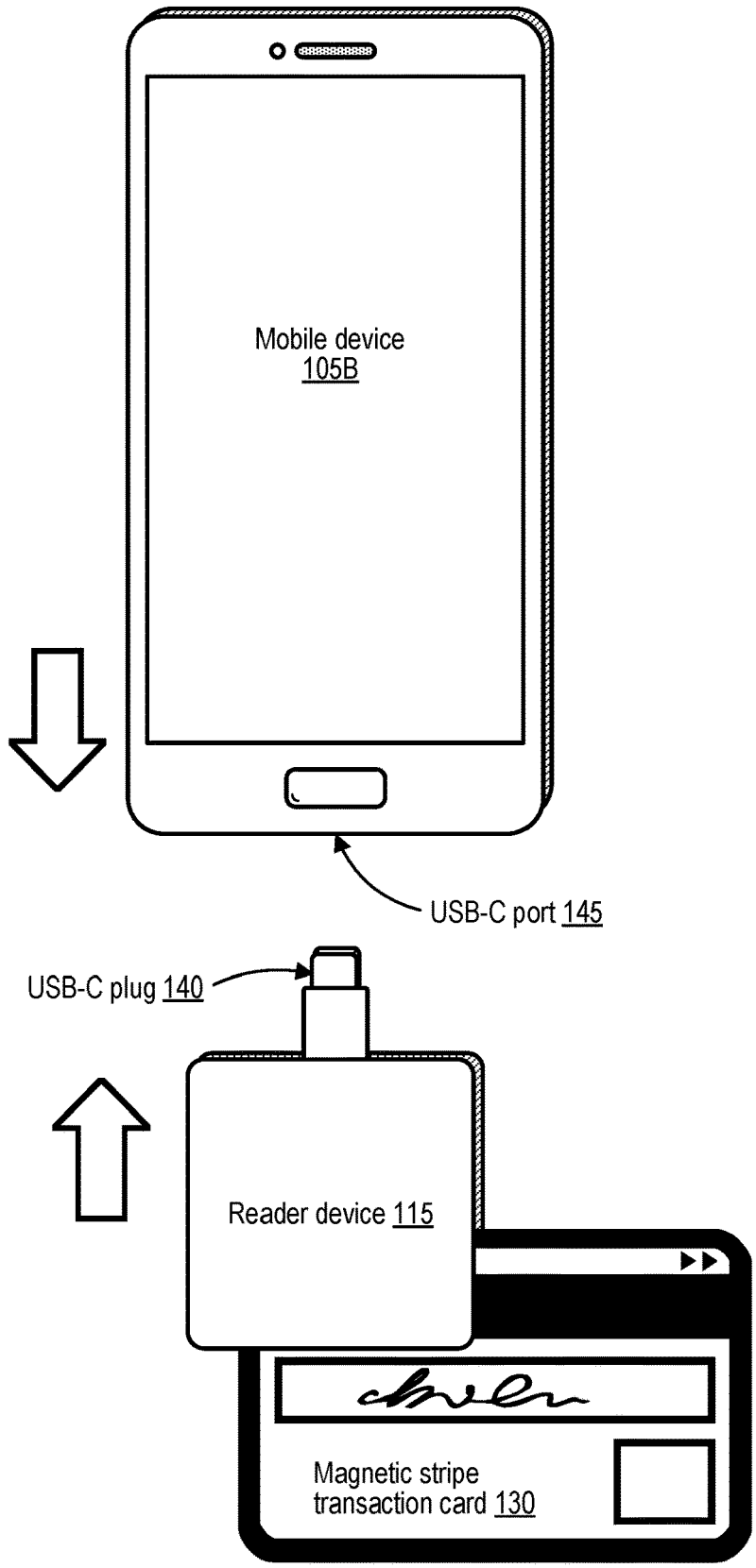
FIG. 1B illustrates a magstripe card reader with a Universal Serial Bus Type-C (USB-C) plug to be plugged into a USB-C port of a mobile device.

FIG. 1B illustrates a magstripe card reader with a Universal Serial Bus Type-C (USB-C) plug to be plugged into a USB-C port of a mobile device.

In particular, FIG. 1B illustrates a card reader device 115 with USB-C plug 140 as well as a mobile device 105A with an USB-C port 145. A magnetic stripe transaction card 130 is illustrated partially inside a card slot of the reader device 115. While a USB-C plug 140 and port 145 are illustrated in FIG. 1B, it should be understood that other corresponding types of plugs and ports following other USB standards may be used, such as USB Type A, USB Type B, USB Mini-A, USB Micro-A, USB Mini-B, USB Micro-B, or some combination thereof. Each of the USB plug 140 and port 145 may optionally be USB on-the-go compliant.

White block arrows to the left of the card reader device 115 and the mobile device 105A indicate that the plug 140 is meant to enter the port 145.

The term "connector" as used herein may refer to a plug, a port, a cable, or a wireless transceiver.

Figure 1C:
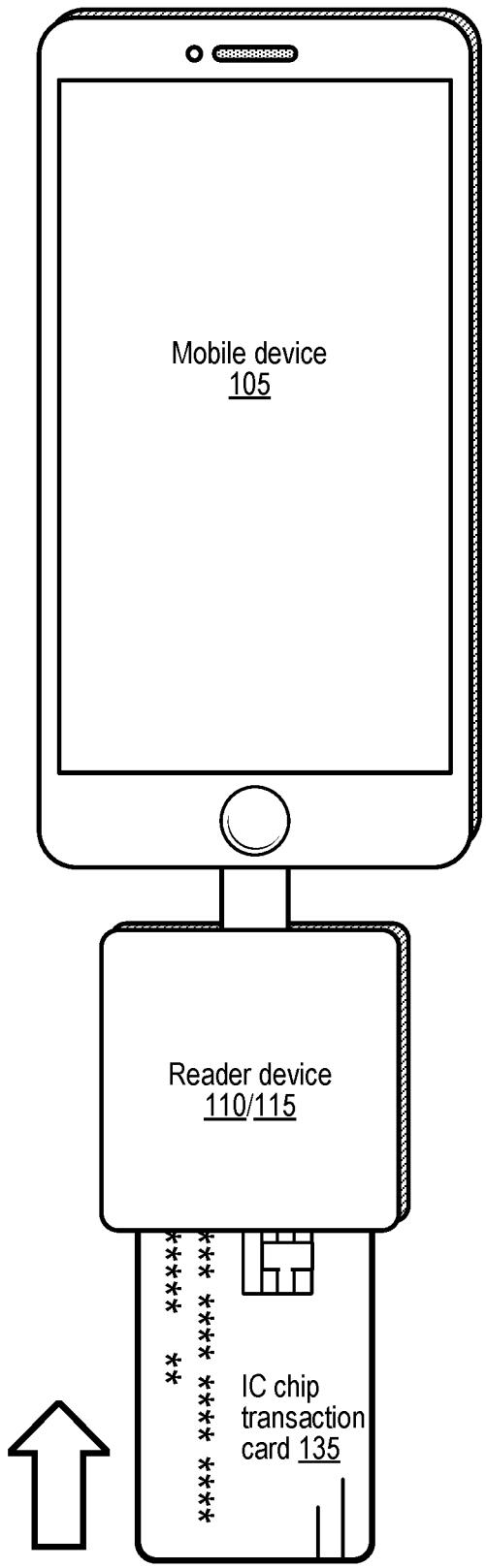
FIG. 1C illustrates an integrated circuit (IC) chip card reader plugged into a mobile device via Apple® Lightning® connectors or USB-C connectors.

FIG. 1C illustrates an integrated circuit (IC) chip card reader plugged into a mobile device via Apple® Lightning® connectors or USB-C connectors.

The mobile device 105 and reader device 110/115 of FIG. 1C may be any of the types discussed with respect to FIGS. 1A-1B. That is, the mobile device 105 of FIG. 1C may be either a mobile device 105A with an Apple® Lightning® port 125 as in FIG. 1A or a mobile device 105B with a USB port 145 as in FIG. 1B. Likewise, the reader device 110/115 of FIGURE C may include an Apple® Lightning® plug 120 as in FIG. 1A or a USB plug 140 as in FIG. 1B.

The reader device 110/115 of FIG. 1C includes an IC chip card reader instead of or in addition to the magstripe card reader illustrated in FIG. 1A and FIG. 1B. The IC chip card reader can read transaction information from an IC chip of an IC chip transaction card 135. Smartcard chips and Europay/Mastercard/Visa (EMV) chips are types of IC chips. A white block arrow to the left of the IC chip transacting card 135 indicate that the IC chip transaction card 135 is meant to be insterted into a transaction card slot at the bottom of the reader device 110/115 as oriented in FIG. 1C. That is, the transaction card slot is located along a surface opposite to a surface from which the neck 205 and plug 120/140 protrude.

The IC chip card reader may be located along a surface of the same slot as the magstripe read head(s). If the same slot is used, the IC chip card reader can be disposed along an opposite surface of the same slot in comparison to the magstripe read head(s) since transaction card that include both an IC chip and a magnetic stripe typically include them on opposite sides of the transaction card. Alternately, the IC chip card reader can be disposed along the same surface of the same slot as the magstripe read head(s), which may simplify the internal electronics/construction of the reader device 110/115, for example by allowing both the IC chip card reader and the magstripe read head(s) to be located along a single surface of a single printed circuit board (PCB). Alternated, the reader device 110/115 may include an IC chop card reader and/or magstripe read head on each of the two surfaces along the slot, to make sure that a transaction card is read no matter which direction it is inserted into or slid through the slot.

Alternately, the reader device 110/115 may include two slots—one for the magstripe read head(s) and one for the IC chip card reader. The planar interior of these slots, and the planar surfaces of the reader device 110/115 along each of these slots, may be parallel to each other. If two slots are included, the magstripe read head(s) and IC chip card reader may be disposed along opposite sides of the same PCB, where at least a portion of the PCB may be in the "wall" space between the two slots.

Figure 6:
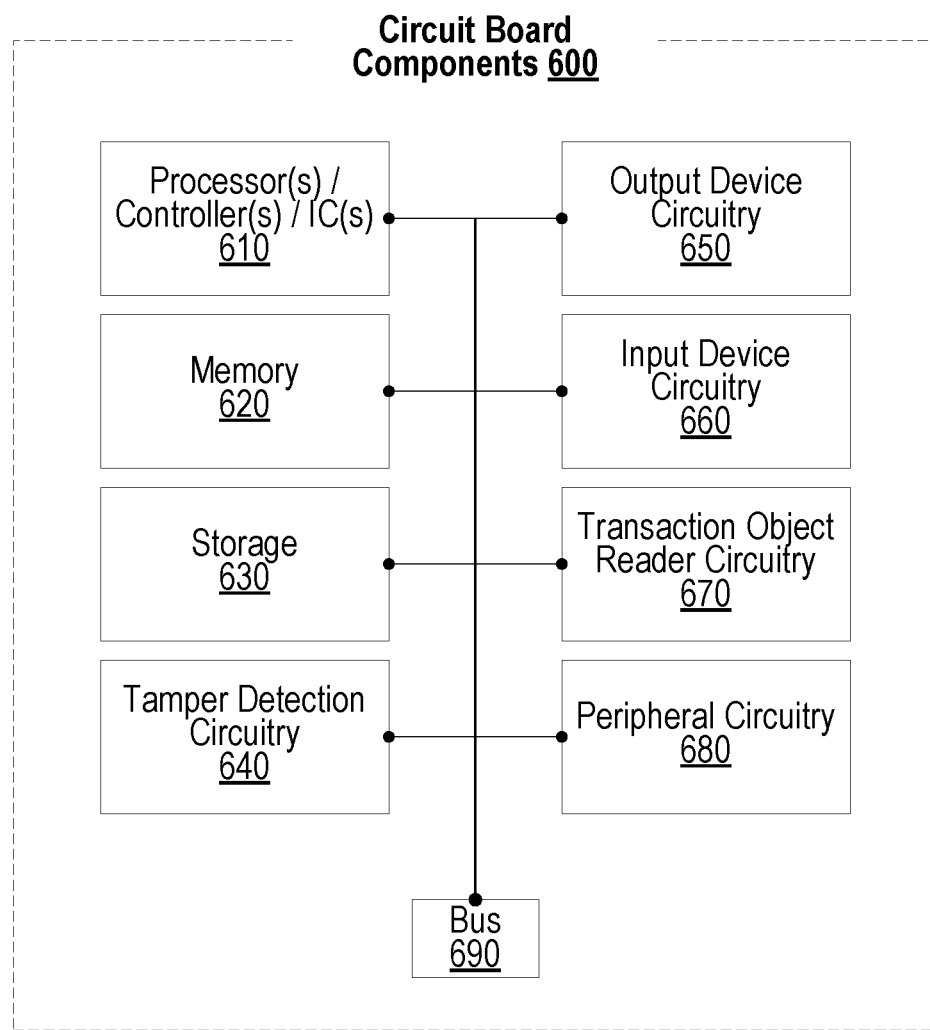
FIG. 6 is a block diagram of exemplary components that may be present on the circuit board.

Both the magstripe read heads and IC chip card reader are further described with respect to the transaction object reader circuitry 670 of FIG. 6.

Figure 1D:
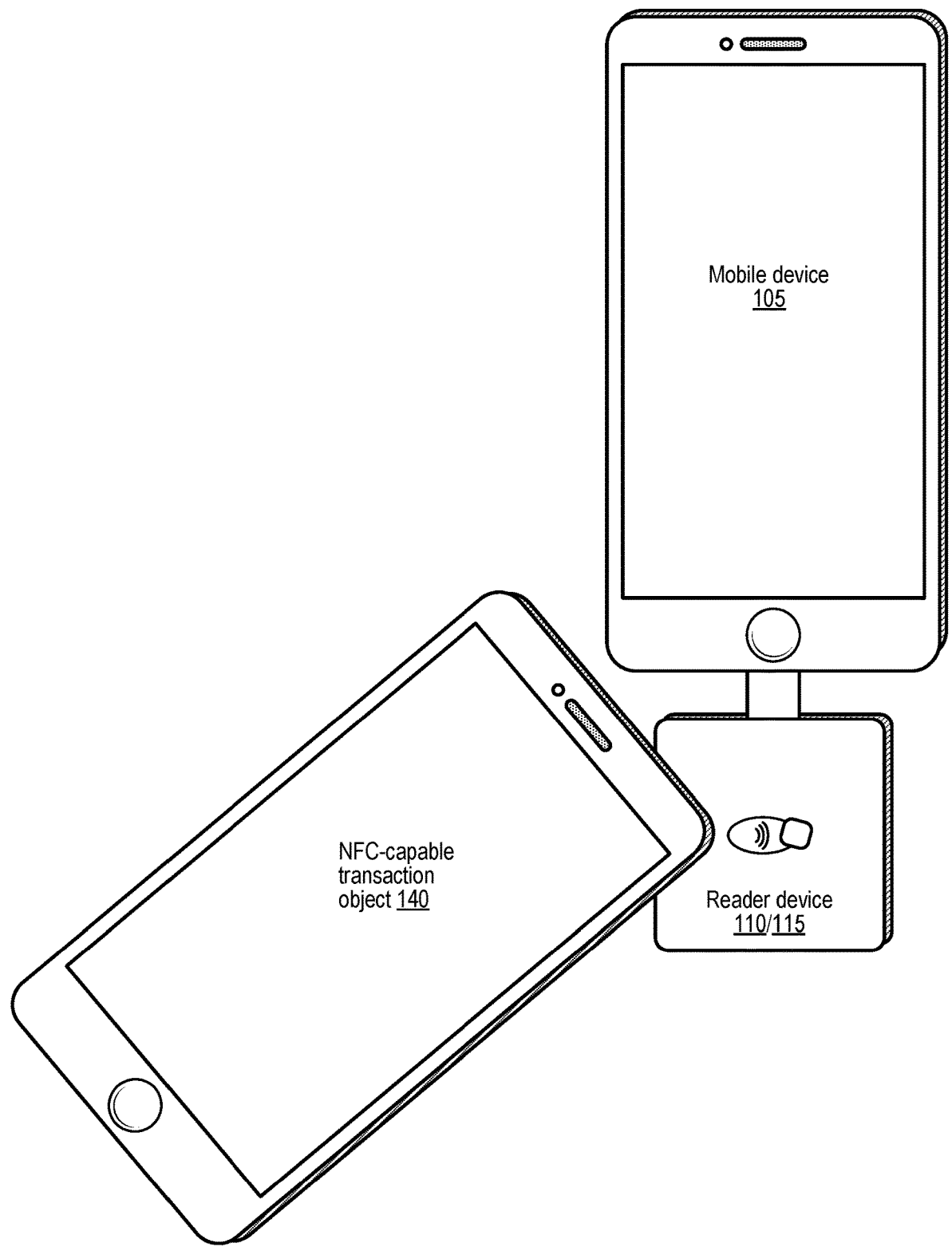
FIG. 1D illustrates a near field communication (NFC) object reader plugged into a mobile device via Apple® Lightning® connectors or USB-C connectors.

FIG. 1D illustrates a near field communication (NFC) object reader plugged into a mobile device via Apple® Lightning® connectors or USB-C connectors.

The mobile device 105 and reader device 110/115 of FIG. 1D may be any of the types discussed with respect to FIGS. 1A-1C.

The reader device 110/115 of FIG. 1D includes an NFC object reader that reads transaction information wirelessly from the NFC-capable transaction object 140 of FIG. 1D, which is illustrated as another mobile device similar to the mobile device 105. The NFC-capable transaction object 140 may alternately be an NFC-capable transaction card similar to the cards 130 and 135 of FIGS. 1A-1C, or may be a wearable device such as a smartwatch, bracelet, ring, glasses, or other fashion accessory.

The reader device 110/115 of FIG. 1D may include the NFC reader instead of or in addition to either or both of the magstripe read head(s) and/or IC chip card reader(s) illustrated and discussed with respect to FIGS. 1A-1C.

The NFC transaction object reader is further described with respect to the transaction object reader circuitry 670 of FIG. 6.

Figure 2A:
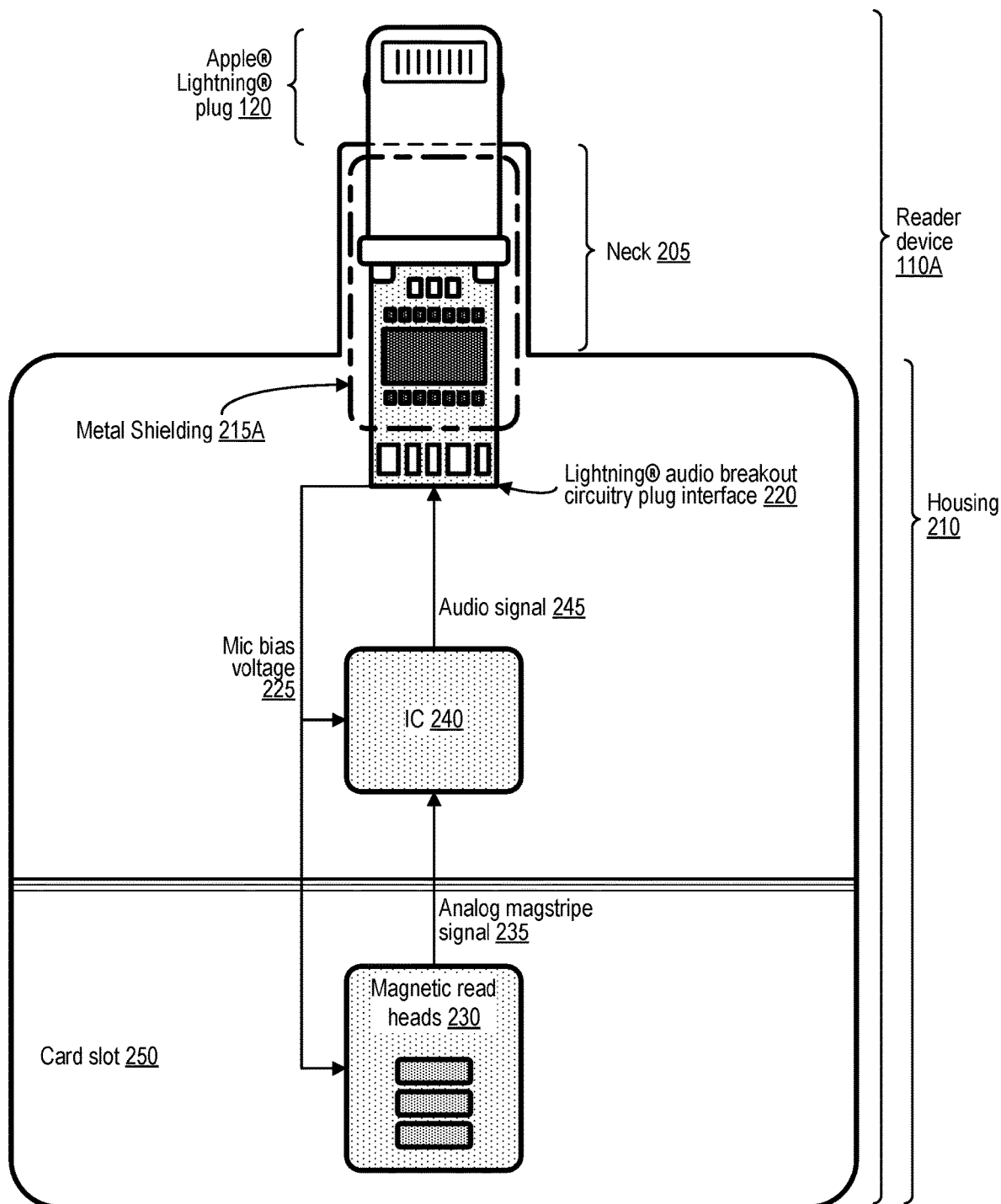
FIG. 2A illustrates a cross-section view of a magstripe card reader with an Apple® Lightning® plug and an audio breakout circuitry connector interface.

FIG. 2A illustrates a cross-section view of a magstripe card reader with an Apple® Lightning® plug and an audio breakout circuitry connector interface.

The card reader device 110A of FIG. 2A includes a housing 210 and a neck 205 extending from a surface of the housing 210. An Apple® Lightning® plug 120 extends from the neck 205. A portion of the plug 120 is hidden within the neck 205. The plug 120 includes an attached Apple® Lightning® audio breakout circuitry 220, which functions as connector interface for the Apple® Lightning® plug connector 120.

The Apple® Lightning® audio breakout circuitry 220 pulls out analog audio signals from digital data received via the Apple® Lightning® plug 120, for example via a digital-to-analog converter (DAC). The Apple® Lightning® audio breakout circuitry 220 also receives analog audio signals and converts them into digital data that the Apple® Lightning® plug 120 can output, for example via an analog-to-digital converter (ADC).

A direct current (DC) microphone bias voltage 225, ordinarily intended to power microphones at approximately two to three volts, is pulled from the Apple® Lightning® audio breakout circuitry 220 in the card reader device 110A of FIG. 2A. The microphone bias voltage 225 is used to power magnetic read heads 230 used for reading a magnetic stripe. Three read heads 230 are included to read all three tracks of the magnetic stripe simultaneously as the card is swiped through the card slot 250. The microphone bias voltage 225 is used to power an integrated circuit (IC) 240, which is illustrated in more detail in FIG. 4.

When a magnetic stripe card 130 is swiped through the card slot 250, the magnetic read heads 230 read the magnetic stripe of the card 130 and produce an analog magnetic stripe signal 235, which is passed over to the IC 240. The IC 240 receives the analog magnetic stripe signal 235. As illustrated and discussed in more detail with respect to FIG. 4, the IC 240 generates a digital version of the analog magnetic stripe signal 235 via amplifiers and ADCs. The IC 240 then converts the resulting binary into an alphanumeric American Standard Code for Information Interchange (ASCII) string, and encrypts the this ASCII string. The IC 240 then turns the encrypted digital version of the analog magnetic stripe signal 235 into an audio signal 245. The Apple® Lightning® audio breakout circuitry 220 then receives the audio signal 245, generally via a microphone audio input node of the Apple® Lightning® audio breakout circuitry 220.

The Apple® Lightning® audio breakout circuitry 220 then converts the audio signal 245 into a digital Apple® Lightning® signal and sends it from the Apple® Lightning® plug 120 to the Apple® Lightning® port 125 of the mobile device 105A. The mobile device 105A can then use Wi-Fi, WLAN, a cellular network, or any other network discussed with respect to FIG. 6 to contact an appropriate server given the type of card that was read—that is, credit, debit, transit, or any of the other types of card or transaction objects discussed with respect to the transaction object reader circuitry 670 of FIG. 6. The server then responds to the mobile device 105A with a confirmation that the transaction was completed, optionally after additional authorizations or verifications are performed between the mobile device 105A and the server, authorizing and/or verifying the mobile device 105, the card 130, and/or the card reader 110.

A metal shielding 215A, drawn only as a dashed outline in FIGS. 2A-2C and FIGS. 3A-3B, is optionally included within the neck 205 and extending into a portion of the housing 210. The metal shielding 215A protects a portion of the plug 120 and a portion of the plug interface 220. The metal shielding 215 may optionally include non-conductive material on an inner surface to avoid causing a short-circuit, particularly at any of the exposed conductive nodes of the plug interface 220. The metal shielding 215 may optionally include a glue or other adhesive, or one or more clips, to help keep the plug 120 fastened to the plug interface 220.

Figure 2B:
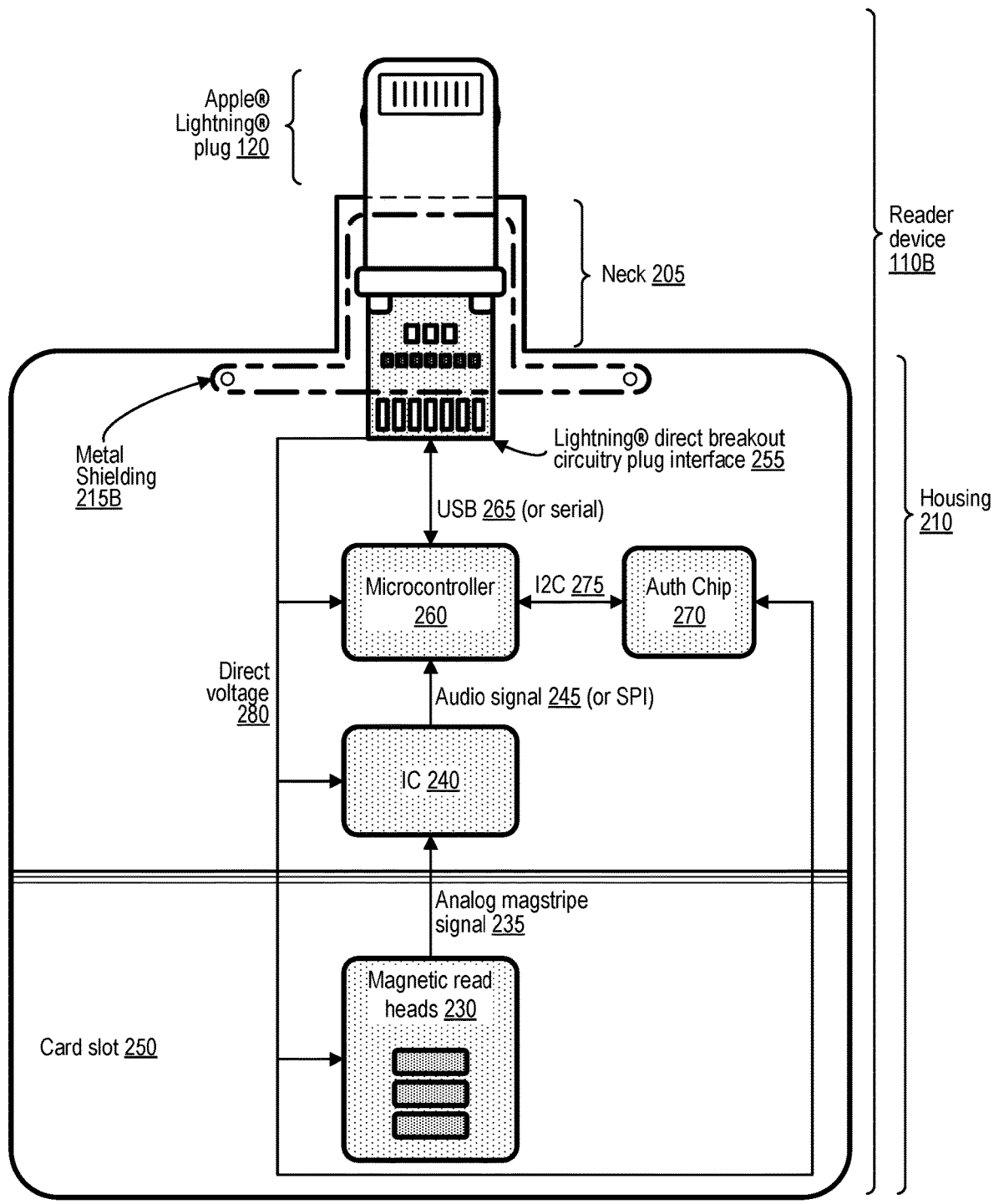
FIG. 2B illustrates a cross-section view of a magstripe card reader with an Apple® Lightning® plug and a microcontroller and authorization chip.

FIG. 2B illustrates a cross-section view of a magstripe card reader with an Apple® Lightning® plug and a microcontroller and authorization chip.

The reader device 110B of FIG. 2B is slightly different than the reader device 110A of FIG. 2A mainly in that the plug interface 255 in the reader device 110B of FIG. 2B is a direct breakout circuitry plug interface 255 that stays in digital rather than switching over to analog audio like the plug interface 220 of FIG. 2A.

This plug interface 255 still provides a voltage 280, which like in FIG. 2A, is used to power the magnetic read heads 230 and the IC 240. These components function similarly to how they did previously, though the IC 240 can now output either the audio signal 245 that it did in FIG. 2A or it can output a digital Serial Peripheral Interface (SPI) signal.

The voltage 280 is also used to power a microcontroller 260 and an authorization chip 270 in the reader device 110B of FIG. 2B. The microcontroller 260 receives the output of the IC 240 and converts it into either a Universal Serial Bus (USB) 265 signal or an Apple® serial signal, depending on what the plug interface 255 accepts. The microcontroller 260 may be, for example a Texas Instruments TI-MSP430 microcontroller.

The authorization chip 270 is a chip provided by Apple® that provides "Made for iPod/iPhone" (MFI) licensing authorization. Generally, the audio breakout plug interface 120 of FIG. 2A includes the authorization chip 270 as part of the plug interface 120, though the more direct digital plug interface 255 of FIG. 2B requires the authorization chip to be present separately. The authorization chip 270 communicates via Inter-Integrated Circuit (I2C).

Another difference between FIG. 2A and FIG. 2B is that the reader device 110B of FIG. 2B includes a different metal shielding 215B. The metal shielding 215B of FIG. 2B is, at the potion that is in the housing 210, flared out to be wider than the neck 205. This prevents the metal shielding 215B, and the plug 120 and plug interface 255 that it protects, from being accidentally pulled out of the neck 205 when a pulling force is applied, for example when a user is unplugging the reader device 110B from their mobile device 105A. The metal shielding 215B of FIG. 2B also appears to include mounting holes at the end of the flared out portions, allowing the metal shielding 215B to be screwed or otherwise securely affixed to the housing 210.

Figure 2C:
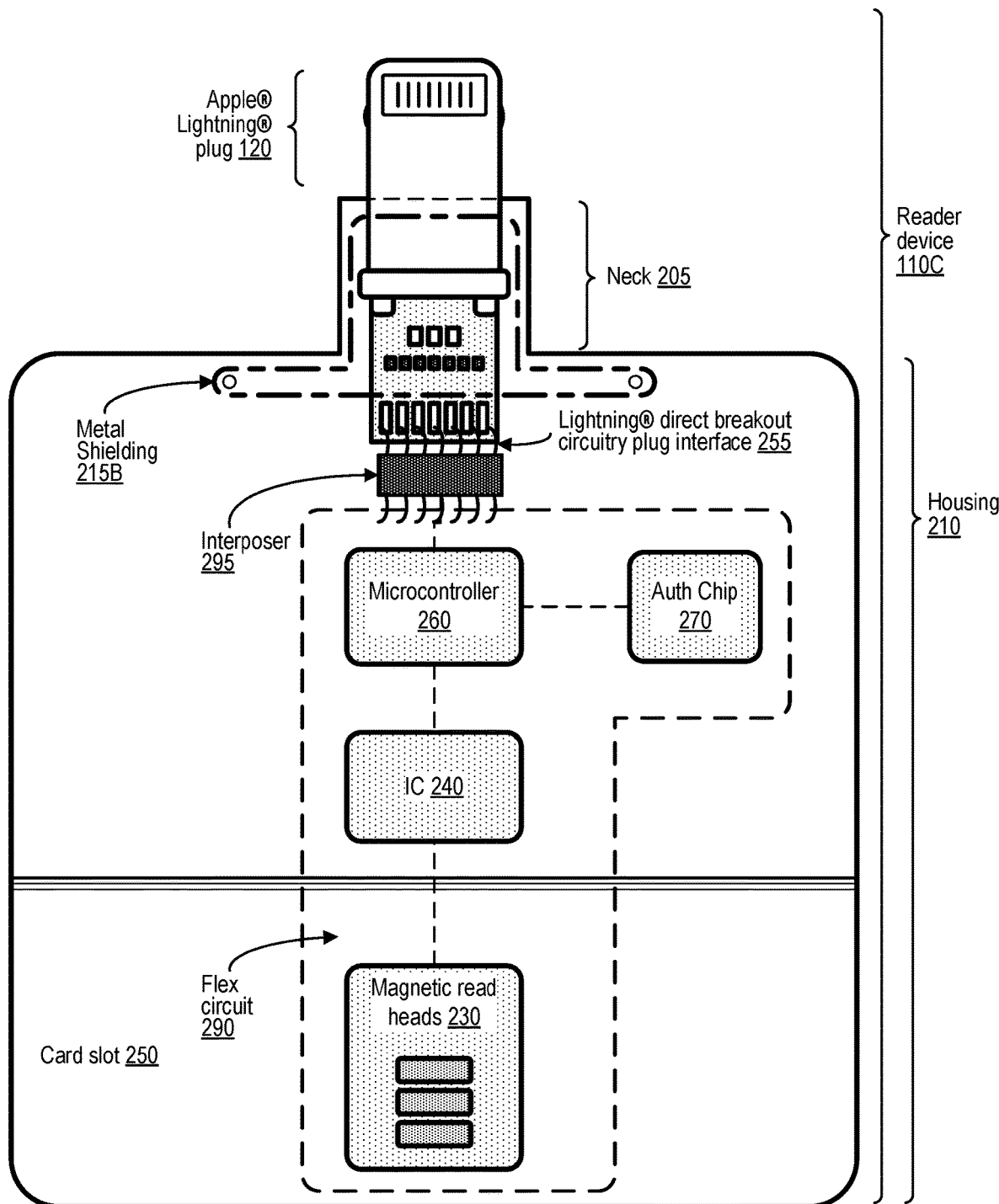
FIG. 2C illustrates a cross-section view of a magstripe card reader with an Apple® Lightning® plug, a flex circuit, and an interposer.

FIG. 2C illustrates a cross-section view of a magstripe card reader with an Apple® Lightning® plug, a flex circuit, and an interposer.

The reader device 110C of FIG. 2C is almost identical to the reader device 110B of FIG. 2B. In the reader device 110C of FIG. 2C, however, the magnetic read heads 230, the IC 240, the microcontroller 260, and the authorization chip 270 are all located on a single flex circuit 290. This allows the reader device 110C to be very compact, to keep cool by allowing more airflow, and more organized.

Additionally, the reader device 110C of FIG. 2C connects the flex circuit 290 to the plug interface 255 via an interposer block 295 in between. Use of the interposer block 295 here offers technical benefits over alternatives. Soldering wires from the flex circuit 290 to the plug interface 255 fills up a lot of space within the reader device 110C, which contributes to overheating and leaves the interior tangled and difficult to repair, not to mention time-consuming and difficult to solder and wire at such small scales to begin with. Soldering the flex circuit 290 directly to the plug interface 255 saves space and is neat if done correctly, but is also difficult to repair, and there is no good way to check if solder joints are successful that way. Use of the interposer block 295 solves these issues, making construction and repairs and solder joint inspection easy. Use of the interposer block 295 also provides some mechanical benefits. That is, if the interposer block 295 is affixed or anchored to the housing, it can provide more stability and can help ensure that the plug 120, plug interface 255, and metal shielding 215B cannot move more than they should. On the other hand, if the interposer block 295 is not affixed or anchored to the housing, it can provide more flexibility for the flex circuit 290 and can prevent it from tearing under stress by giving it a little more space to move.

While the reader device 110C of FIG. 2C illustrates the magnetic read heads 230, the IC 240, the microcontroller 260, and the authorization chip 270 all located on a single flex circuit 290, in a different reader device 110/115, any subset or combination of these components, or any other components discussed with respect to FIG. 6, may be on one or more flex circuits 290 within that particular reader device 110/115.

Figure 3A:
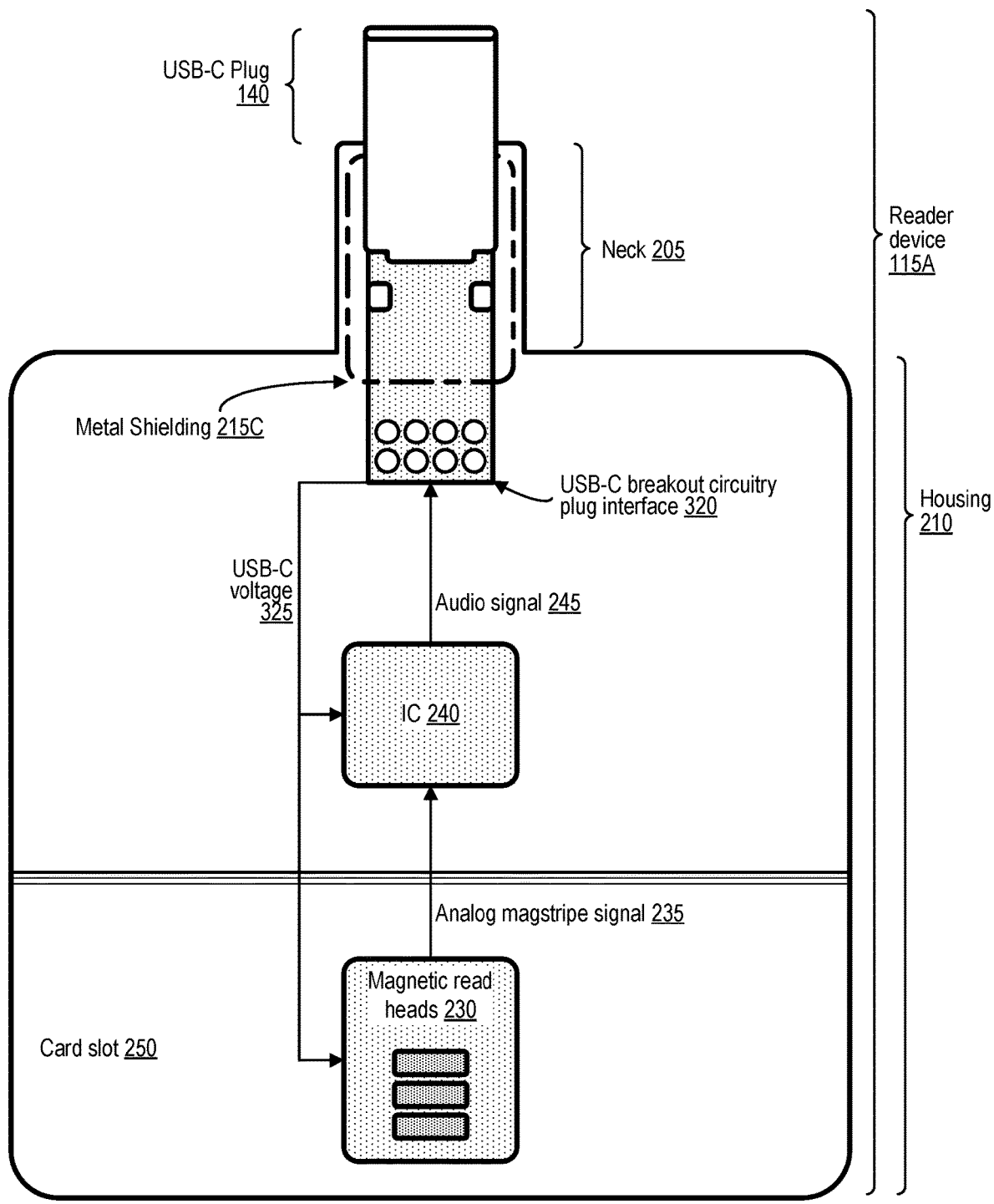
FIG. 3A illustrates a cross-section view of a magstripe card reader with a Universal Serial Bus Type-C (USB-C) plug and a connector interface operating in audio adapter accessory mode.

FIG. 3A illustrates a cross-section view of a magstripe card reader with a Universal Serial Bus Type-C (USB-C) plug and a connector interface operating in audio adapter accessory mode.

Like the reader device 110A of FIG. 2A, the reader device 115A of FIG. 3A includes only the magnetic read heads 230 and IC 240, both of which are powered by USB-C voltage 325 from the USB-C plug interface 320 but otherwise function the same way they do in FIG. 2A.

The USC-C plug 140 and USB-C plug interface 320 in FIG. 3A utilize the "audio adapter accessory mode" of USB-C, which allows analog audio signals to be sent directly over USB-C. Unfortunately, not all USB-C mobile devices 105B support audio adapter accessory mode, and figuring out which devices do support this mode is fairly unpredictable. In the end, then, while the reader device 115A of FIG. 3A is appealingly simple, it is not as practical as the reader device 115B of FIG. 3B, which has no such limitations.

Figure 3B:
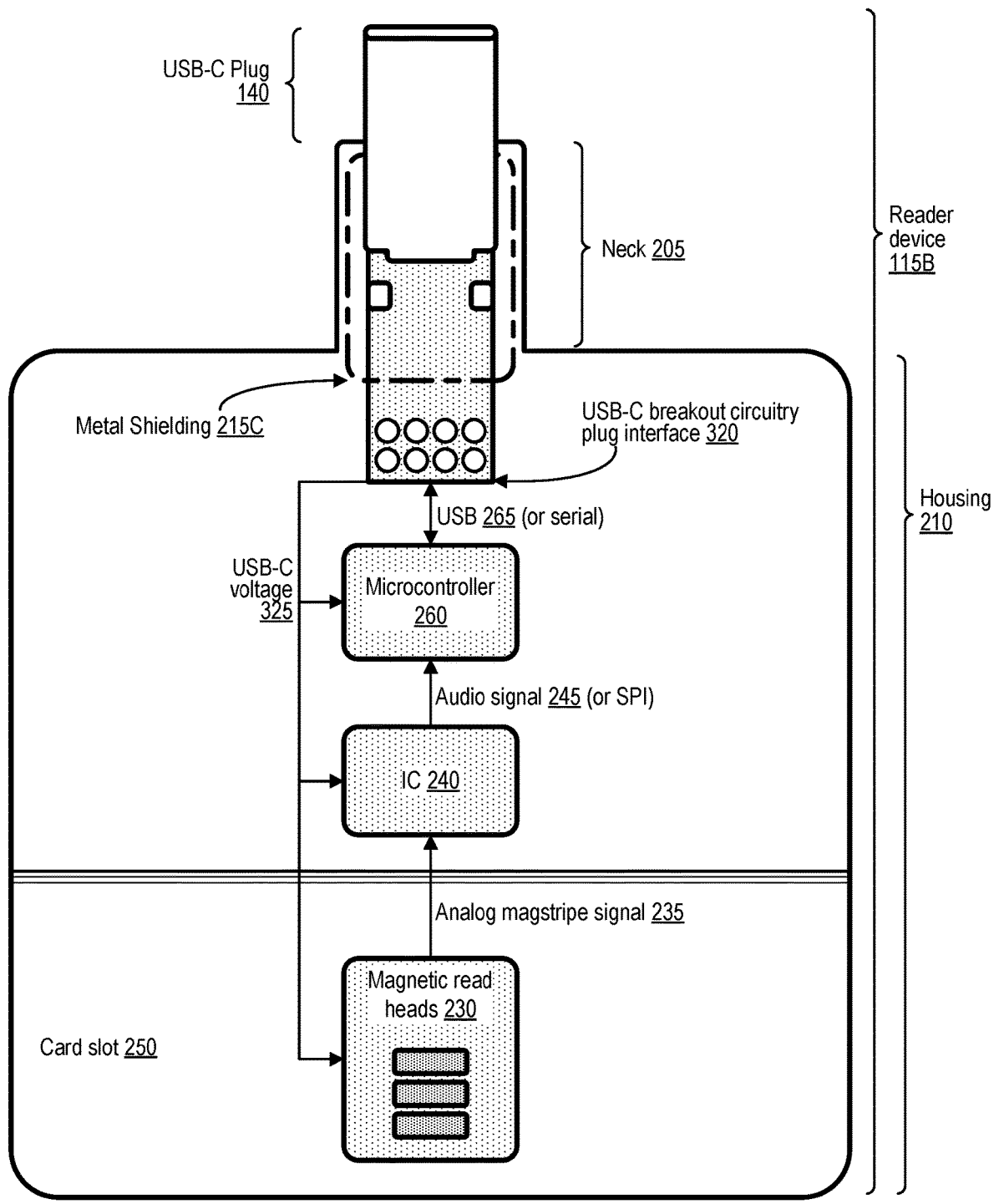
FIG. 3B illustrates a cross-section view of a magstripe card reader with a Universal Serial Bus Type-C (USB-C) plug and a connector interface and a microcontroller.

FIG. 3B illustrates a cross-section view of a magstripe card reader with a Universal Serial Bus Type-C (USB-C) plug and a connector interface and a microcontroller.

Like the reader device 110B of FIG. 2B, the reader device 115B of FIG. 3B includes the magnetic read heads 230, IC 240, and microcontroller 260, each of which are powered by USB-C voltage 325 from the USB-C plug interface 320 but otherwise function mostly the same way they do in FIG. 2B.

The authorization circuit 270 of the reader device 110B of FIG. 2B is not necessary in the reader device 115B of FIG. 3B because the USB-C standard does not need to be licensed or authorized the way that the Apple® Lightning® MFI standard does.

Figure 4:
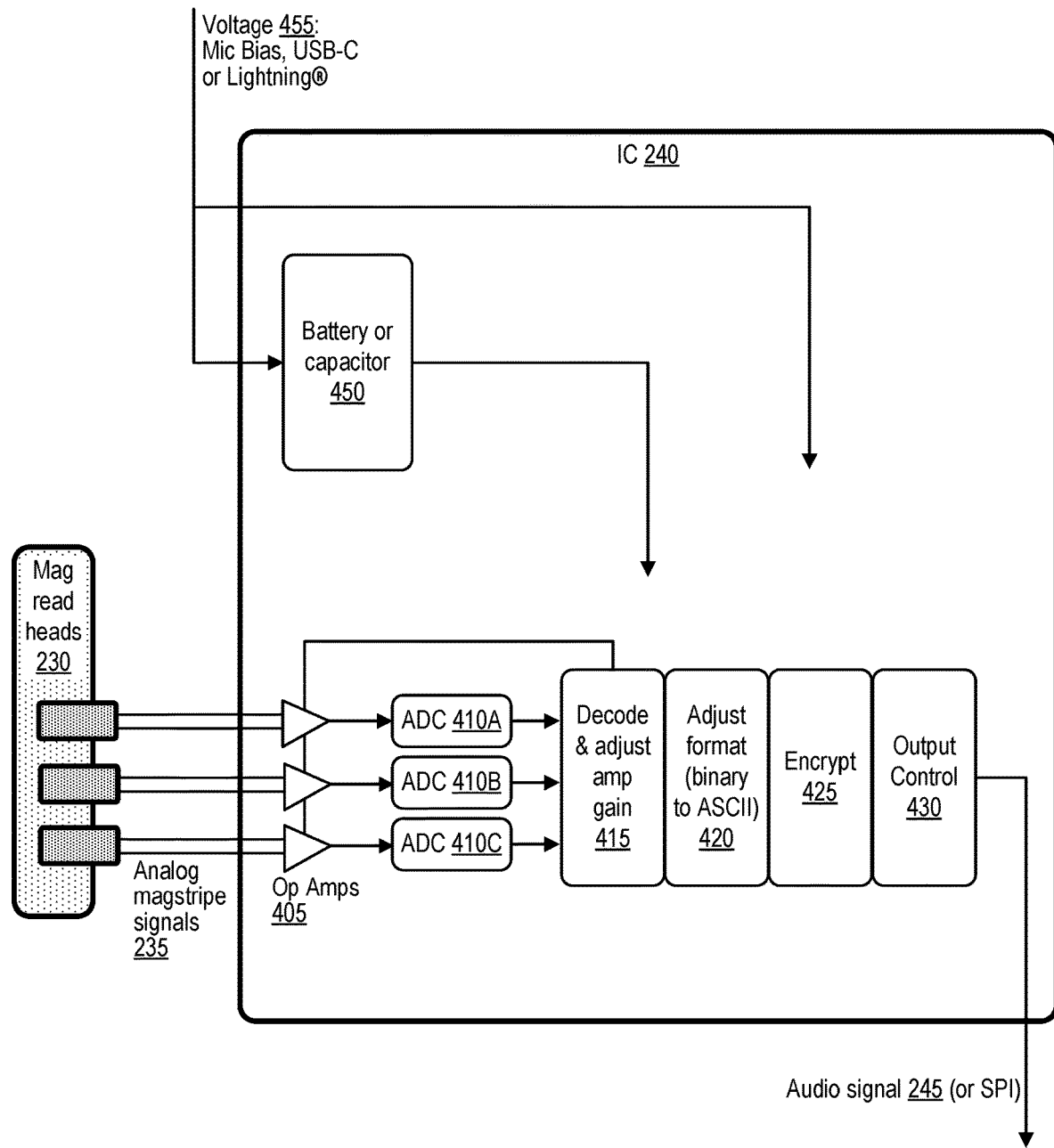
FIG. 4 illustrates a block diagram of an integrated circuit used in the magstripe card reader.

FIG. 4 illustrates a block diagram of an integrated circuit used in the magstripe card reader.

A voltage 455 provided as microphone bias voltage, USB-C voltage, Apple® Lightning® voltage, or some other voltage is provided to the IC 240, which may be used directly to power the components of the IC 240 or may be used to charge a battery 450 and/or capacitor 450 that, in turn, is used to power the components of the IC 240.

The magnetic read heads 230 supply inputs to the IC 240 in the form of analog magnetic stripe signals 235. IC 240 generates a digital version of the analog magnetic stripe signal 235 via operational amplifiers 405 and ADCs 410. The IC decodes the result of the ADCs 410 at block 415 and simultaneous adjusts gain of the operational amplifiers as needed. At block 420, the IC 240 then converts the resulting binary into an alphanumeric American Standard Code for Information Interchange (ASCII) string, and then encrypts the this ASCII string at block 425. The IC 240 then turns the encrypted digital version of the analog magnetic stripe signal 235 into an audio signal 245 or SPI signal 245 at the output control block 430. Each of blocks 415-430 may be a single component of any kind discussed with respect to element 610 of FIG. 6, or a cluster of such components. At the same time, certain ones of the blocks 415-430 (and their associated components) may be combined and/or rearranged.

Figure 5:
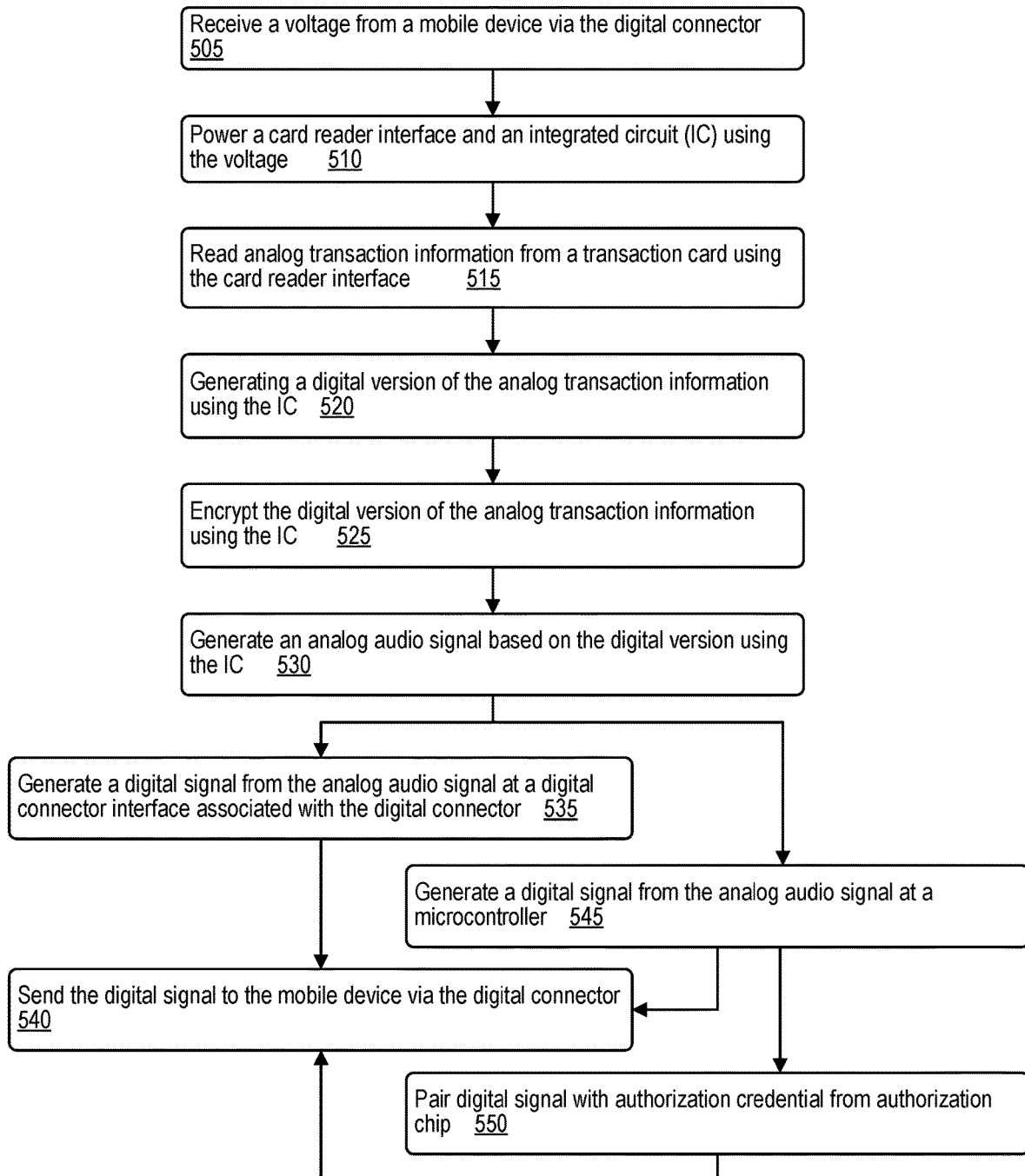
FIG. 5 is a flow diagram illustrating operation of a magstripe card reader with a digital connector and an internal audio signal path.

FIG. 5 is a flow diagram illustrating operation of a magstripe card reader with a digital connector and an internal audio signal path.

At step 505, the reader device 110/115 receives a voltage from a mobile device via the digital connector. At step 510, the voltage is used to power a card reader interface such as the read head (or another type of transaction object reader circuitry 670 discussed with respect to FIG. 6) and an integrated circuit (IC) using the voltage.

At step 515, the magnetic read head 230 or other transaction object reader circuitry 670 is used to read analog transaction information from a transaction card or other transaction object.

At step 520, the IC 240 generates a digital version of the analog transaction information. At step 525, the IC 240 encrypts the digital version of the analog transaction information. At step 530, the IC 240 generates an analog audio signal or SPI signal based on the digital version. Step 530 is followed by step 545 if the reader device 110/115 includes a microcontroller 260 (see reader devices 110B, 110C, 115B), and by step 535 if it does not (see reader devices 110A, 115A).

At step 535, the digital connector interface (e.g., plug interfaces 220, 255, 320) associated with the digital connector (e.g., plug 140, 145) generates a digital signal from the analog audio signal.

At step 540, the reader device 110/115 sends the digital signal to the mobile device 105 via the digital connector.

At step 545, the microcontroller 260 generates a digital signal from the analog audio signal or SPI signal. Step 545 is followed by step 550 if the reader device 110 includes an authorization chip 270 (see reader devices 110B, 110C), and by step 540 if it does not (see reader device 115B).

At step 550, the reader device 110 pairs the digital signal with authorization credential from authorization chip 270. Step 550 is followed by step 540.

FIG. 6 illustrates exemplary circuit board components 600 that may be used to implement an embodiment of the present invention. The circuit board 100 described herein may include any combination of at least a subset of the circuit board components 600. In some embodiments, the circuit board 100 may actually include multiple circuit boards connected in a wired or wireless fashion, some of which may be at least partially enclosed by the security housing.

The circuit board components 600 of FIG. 6 may include one or more processors 610, controllers 610, microcontrollers 610, application specific integrated circuits (ASICs) 610, or field-programmable gate arrays (FPGAs) 610. These may in some cases aid in tamper detection, such as by performing at least some subset of the functions identified in FIG. 6. The circuit board components 600 of FIG. 6 may include one or more memory components 620 that may store, at least in part, instructions, executable code, or other data for execution or processing by the processor or controller 610. The memory components 620 may include, for example, cache memory, random access memory (5 AM), read-only memory (ROM), or some other type of computer-readable storage medium.

The circuit board components 600 of FIG. 6 may further includes one or more computer-readable storage medium(s) 630 for storing data, such as a hard drive, magnetic disk drive, optical disk drive, flash memory, magnetic tape based memory, or another form of non-volatile storage. These may, for example, store credit card information, cryptographic keys, or other information, and may in some cases encrypt or decrypt such information with the aid of the processor or controller 610. The computer-readable storage medium(s) 630 may in some cases store, at least in part, instructions, executable code, or other data for execution or processing by the processor or controller 610.

The circuit board components 600 of FIG. 6 may include tamper detection circuitry 640, which may include any of the tamper detection circuit 150 discussed herein, and may include the board connector piece holder(s) 255 and any components discussed in FIG. 6.

The circuit board components 600 of FIG. 6 may include output device circuitry 650, which may include, for example, communication circuitry for outputting data through wired or wireless means, display circuitry for displaying data via a display screen, audio circuitry for playing audio via headphones or a speaker, printer circuitry for printing data via a printer, or some combination thereof. The display screen may be a liquid crystal display (LCD), a plasma display, an organic light-emitting diode (OLED) display, an electronic ink display, a projector-based display, a holographic display, or some combination thereof. The printer may be inkjet, laserjet, thermal, or some combination thereof. In some cases, the output device circuitry 650 may allow for transmission of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. The output device circuitry 650 may also include The circuit board components 600 of FIG. 6 may include input device circuitry 660, which may include, for example, communication circuitry for outputting data through wired or wireless means, microphone circuitry for receiving audio data, user interface circuitry for receiving user interface inputs, or some combination thereof, and may include variable pressure detection. Touchscreens may be capacitive, resistive, acoustic, or some combination thereof. In some cases, the input device circuitry 660 may allow receipt of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. Input device circuitry 660 may receive data from an alpha-numeric keypad or keyboard, a pointing device, a mouse, a trackball, a trackpad, a touchscreen, a stylus, cursor direction keys, or some combination thereof. The input device circuitry 660 may also receive data from the transaction object reader circuitry 670.

The circuit board components 600 of FIG. 6 may include transaction object reader circuitry 670, which may include components capable of reading information from a transaction object, or may include circuitry supporting components capable of reading information from a transaction object, with the actual object reader components located off of the circuit board 100. The transaction object reader 670 may include at least one card reader. In this case, the transaction object may be a magnetic stripe onboard a transaction card, an integrated circuit (IC) chip onboard a transaction card, and/or a smartcard chip onboard a transaction card. The transaction card itself may be a credit card, a debit card, an automated teller machine (ATM) card, a gift card, a transit card, an identification card, a game token card, a ticket card, a bank card associated with a bank account, a credit union card associated with a credit union account, an online gaming card associated with an online gaming account, a healthcare card associated with a health savings account (HSA) or flexible spending account (FSA), or a user account card associated with a user account of another type, or some combination thereof. The transaction object reader 670 may include at least one wireless signal reader for reading information wirelessly. In this case, the transaction object may be any of the transaction-card-related transaction objects discussed above (but read wirelessly), or they may be non-card objects capable of wireless communication, such as smartphones, tablets, wearable devices, active near field communication (NFC) and/or radio-frequency identification (RFID) tags, passive NFC and/or RFID tags, or other mobile devices that are capable of wireless communication via NFC, RFID, Bluetooth®, Bluetooth® Low Energy®, WLAN, Wi-Fi, or some combination thereof.

Transaction object reader circuitry 670 may include, for example, a magnetic read head or other type of magnetic stripe reader that is capable of reading information from a magnetic stripe of a transaction card. Transaction object reader circuitry 670 can also include an integrated circuit (IC) chip reader and/or smartcard chip reader for reading an IC chip and/or smartcard chip embedded in a transaction card. Such an IC chip/smartcard chip can follow the Europay-MasterCard-Visa (EMV) payment chip standard. The IC chip/smartcard chip reader can be contact-based, in that it can include one or more conductive prongs that contact a conductive metal contact pad of the IC chip/smartcard chip. The IC chip/smartcard chip can instead be contactless and use a contactless antenna. The contactless antenna can also double as a receiver for near-field-communication (NFC) signals, radio-frequency identification (RFID) signals, Bluetooth® wireless signals, wireless local area network (WLAN) signals, 802.xx Wi-Fi signals, or some combination thereof, which can be sent from a transaction card or from a another type of transaction object as discussed above. In some cases, a transaction object may only send these wireless signals in response to receipt of a magnetic field or other wireless signals from the transaction object reader circuitry 670. For example, if the transaction object is a passive NFC/RFID tag or functions based on similar technology, it generates energy from the magnetic field or other wireless signals from the transaction object reader circuitry 670 via induction coil(s) that is then used to transmit the wireless signals that are ultimately read by the transaction object reader circuitry 670.

The information read from the transaction object by the transaction object reader circuitry 670, regardless of the type of the transaction object, may include at least credit card information, debit card information, automated teller machine (ATM) information, gift card account information, transit account information, identification card information, game token card information, ticket information, bank account information, credit union account information, online gaming account information, HSA/FSA account information, health insurance account information, healthcare information, or some combination thereof. Certain terms discussed herein should be understood to refer to transaction objects, including but not limited to "payment object," "transaction object," "financial object," "payment card," "transaction card," or "financial card."

Peripheral circuitry 680 may include any type circuitry permitting connection and use of computer support devices to add additional functionality to the circuit board 100. For example, peripheral circuitry 680 may support connection of a modem or a router. The components shown in FIG. 6 are depicted as being connected via a single bus 690. However, the components may be connected through one or more data transport means. For example, processor unit 610 and main memory 610 may be connected via a local microprocessor bus, and the storage medium 630, tamper detection circuitry 640, output device circuitry 650, input device circuitry 660, transaction object reader circuitry 670, and peripheral circuitry 680 may be connected via one or more input/output (I/O) buses.

While various flow diagrams have been described above, it should be understood that these show a particular order of operations performed by certain embodiments of the invention, and that such order is exemplary. Alternative embodiments can perform the operations in a different order, combine certain operations, or overlap certain operations illustrated in or described with respect to each flow diagram.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A transaction object reader device having a first connector that communicates with a second connector of a mobile device, the transaction object reader device comprising:
   a transaction object reader interface that reads transaction information from a transaction object as a transaction information signal;
   signal interface circuitry that receives the transaction information from the transaction object reader interface, wherein the signal interface circuitry generates an analog signal based on the transaction information signal, wherein the generated analog signal includes a representation the transaction information, wherein the signal interface circuitry generates a digital signal based on the generated analog signal; and
   the first connector, wherein the first connector sends the digital signal to the second connector of the mobile device.

2. The transaction object reader device of claim 1, wherein the transaction information signal is a digital signal.

3. The transaction object reader device of claim 1, wherein the transaction information signal is a second analog signal.

4. The transaction object reader device of claim 1, wherein the signal interface circuitry also includes a digital to analog converter (DAC), wherein the signal interface circuitry generates the analog signal based on the transaction information using the DAC.

5. The transaction object reader device of claim 1, wherein the first connector also outputs power that is provided to at least the signal interface circuitry.

6. The transaction object reader device of claim 1, wherein the first connector receives power from the second connector, wherein the power received from the second connector is provided to at least the signal interface circuitry.

7. The transaction object reader device of claim 1, wherein the first connector receives power from the second connector, wherein the power received from the second connector is provided to at least the transaction object reader interface.

8. The transaction object reader device of claim 1, further comprising:
a battery that provides power to at least the transaction object reader interface and the signal interface circuitry, wherein the first connector receives power from the second connector, wherein the power received from the second connector is provided to charge the battery.

9. The transaction object reader device of claim 1, wherein the transaction object reader interface includes a magnetic stripe reader and the transaction object includes a magnetic stripe of a transaction card, wherein the magnetic stripe reader reads the transaction information from the magnetic stripe in response to receipt of the magnetic stripe through a card slot.

10. The transaction object reader device of claim 1, wherein the transaction object reader interface includes a chip card reader and the transaction object includes a chip of a transaction card, wherein the chip card reader reads the transaction information from the chip in response to receipt of the chip into a card slot.

11. The transaction object reader device of claim 1, wherein the transaction object reader interface includes a near field communication (NFC) reader and the transaction object includes a NFC interface, wherein the NFC reader reads the transaction information from the NFC interface in response to the NFC interface entering into a proximity of the NFC reader.

12. The transaction object reader device of claim 1, wherein the signal interface circuitry encrypts the transaction information, wherein the generated analog signal conveys an encrypted version of the transaction information.

13. The transaction object reader device of claim 1, wherein the generated analog signal is an audio signal.

14. A method of facilitating a transaction, the method comprising:

reading transaction information from a transaction object using a transaction object reader interface of a transaction device;

generating, using signal interface circuitry of the transaction device, an analog signal based on the transaction information; and sending the analog signal to a mobile device using the signal interface circuitry while the signal interface circuitry is in a first mode, wherein a second mode of the signal interface circuitry is associated with transfer of one or more digital signals.

15. The method of claim 14, wherein the signal interface circuitry includes a first connector, wherein the signal interface circuitry sends the analog signal to the mobile device by sending the analog signal through the first connector to a second connector of the mobile device while the first connector is electrically coupled to the second connector.

16. The method of claim 15, wherein the first connector is a Universal Serial Bus (USB) Type-C connector, and wherein the first mode is an audio adapter accessory mode.

17. The method of claim 14, wherein the signal interface circuitry converts a second analog signal of the transaction information into a digital dataset, and wherein the signal interface circuitry generates the analog signal based on the digital dataset.

18. The method of claim 14, wherein the analog signal is an audio signal.

19. The method of claim 14, wherein reading the transaction information from the transaction object using the transaction object reader interface includes reading the transaction information from an element of a transaction card in response to receipt of the transaction card into a card slot, wherein the element is one of a magnetic stripe and a chip.

20. The method of claim 14, wherein reading the transaction information from the transaction object using the transaction object reader interface includes reading the transaction information from a near field communication (NFC) interface in response to the NFC interface entering into a proximity of a NFC reader of the transaction object reader interface.

* * * * *